(12) United States Patent
Schmidt et al.

(10) Patent No.: US 7,331,173 B2
(45) Date of Patent: Feb. 19, 2008

(54) HYDRAULIC SYSTEM FOR A GEARBOX COMPRISING A STARTING CLUTCH

(75) Inventors: Thilo Schmidt, Meckenbeuren (DE); Georg Gierer, Kressbronn (DE); Peter Schiele, Kressbronn (DE)

(73) Assignee: ZF Friedrichschafen AG, Friedrichshafen (DE)

( * ) Notice: Subject to any disclaimer, the term of this patent is extended or adjusted under 35 U.S.C. 154(b) by 81 days.

(21) Appl. No.: 10/542,700

(22) PCT Filed: Jan. 16, 2004

(86) PCT No.: PCT/EP2004/000297

§ 371 (c)(1),
(2), (4) Date: Jul. 20, 2005

(87) PCT Pub. No.: WO2004/065157

PCT Pub. Date: Aug. 5, 2004

(65) Prior Publication Data

US 2006/0123777 A1    Jun. 15, 2006

(30) Foreign Application Priority Data

Jan. 21, 2003   (DE) ............................. 103 02 016

(51) Int. Cl.
*F16D 33/00* (2006.01)
(52) U.S. Cl. .................................................. 60/337
(58) Field of Classification Search .............. 60/337; 192/113.1
See application file for complete search history.

(56) References Cited

U.S. PATENT DOCUMENTS

| | | | |
|---|---|---|---|
| 2,837,285 A * | 6/1958 | Urban ........................ 60/337 |
| 3,202,253 A * | 8/1965 | Merritt et al. ......... 192/113.36 |
| 5,058,716 A | 10/1991 | Lippe et al. |
| 5,305,863 A * | 4/1994 | Gooch et al. ............ 192/70.12 |
| 6,428,445 B1 | 8/2002 | Friedmann et al. |
| 6,668,978 B2 | 12/2003 | Fessler et al. |

FOREIGN PATENT DOCUMENTS

| | | |
|---|---|---|
| DE | 198 48 935 A1 | 4/2000 |
| DE | 199 02 408 A1 | 8/2000 |
| DE | 100 44 177 C1 | 1/2002 |
| DE | 101 34 121 A1 | 10/2002 |

* cited by examiner

*Primary Examiner*—F. Daniel Lopez
(74) *Attorney, Agent, or Firm*—Davis Bujold & Daniels, P.L.L.C.

(57) ABSTRACT

A hydraulic system (1) for a transmission with a starter clutch is described. The hydraulic system (1) is designed to comprise a primary circuit (24) and a secondary circuit (5). A cooling system (9) for the starter clutch, a radiator (7) for hydraulic fluid and a lubricant supply (10) for the transmission are integrated into the secondary circuit (5), where the radiator (7) is arranged upstream from the cooling system (9) for the starter clutch. A volume flow of the hydraulic fluid through the radiator (7) can be limited by way of a controllable bypass line (11), which opens up into the secondary circuit (5) downstream from the radiator (7) and upstream from the cooling system (9) for the starter clutch.

11 Claims, 1 Drawing Sheet

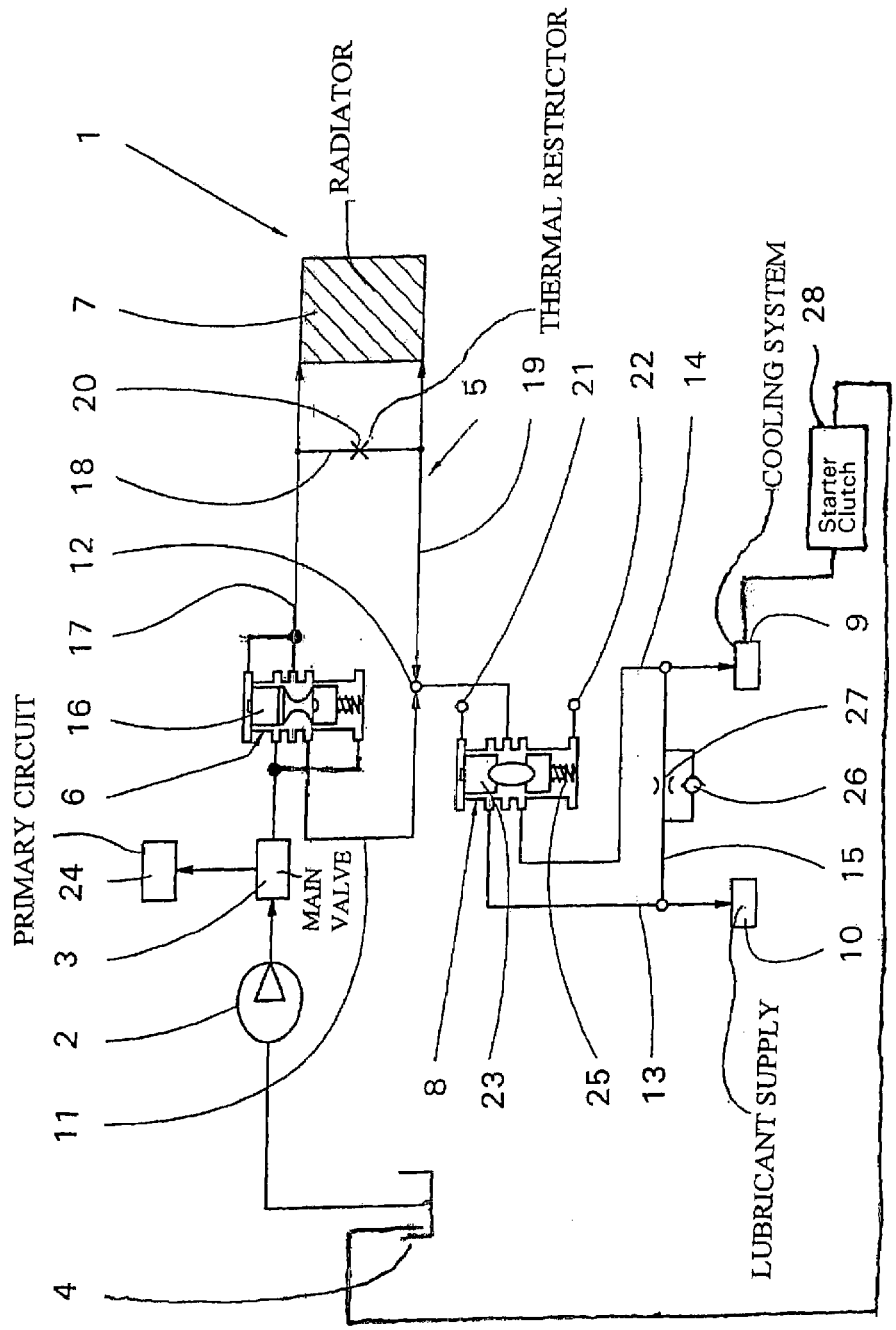

HYDRAULIC SYSTEM FOR A GEARBOX COMPRISING A STARTING CLUTCH

This application is a national stage completion of PCT/EP2004/1000297 filed Jan. 16, 2004 which claims priority from German Application Serial. No. 103 02 016.0 filed Jan. 21, 2003.

FIELD OF THE INVENTION

The invention relates to a hydraulic system for a transmission with a starter clutch.

BACKGROUND OF THE INVENTION

In the drive trains of motor vehicles, starter clutches or hydrodynamic torque converters are customarily used as the starter elements. Especially when a hydrodynamic torque converter is used, a lubricating-cooling concept for an automatic transmission is laid out such that the hydrodynamic torque converter and a lubricating oil circuit are supplied by a hydraulic pump via a secondary circuit of a hydraulic system in the transmission. Shifting components, which are provided for adjusting the gear ratio in the transmission, along with pilot elements in the transmission, are supplied with hydraulic fluid via a primary circuit by the hydraulic pump.

A prioritization of the primary circuit and the secondary circuit is performed via a so-called main pressure valve or a system pressure valve, which is arranged between the hydraulic pump and the primary circuit or the secondary circuit, and distributes the volume flow of hydraulic fluid forced by the hydraulic pump to the two circuits as needed.

The hydraulic fluid that is fed to the secondary circuit, via the main pressure valve, is first fed to the hydrodynamic torque converter. The hydraulic fluid then flows through an oil cooler for cooling it, after which it is used to lubricate the transmission.

In place of the hydrodynamic torque converter, if a friction clutch is used as the starter element, the volume flow of hydraulic fluid that is required for cooling is fed back to the hydraulic fluid reservoir after flowing through the starter clutch and thus cannot be used to lubricate the transmission. Thus, if the hydraulic pressure pump should have decreased pump performance, under certain circumstances an insufficient supply of lubricant to the transmission may result.

Furthermore, known-in-the-art hydraulic systems, via which hydraulic fluid is pumped to a cooling system for the starter clutch, a radiator for the hydraulic fluid and a lubricant supply for the transmission, are designed such that in order to limit the volume flow through the oil cooler a branch line is provided, via which excess hydraulic fluid can be diverted to a hydraulic fluid reservoir, if necessary. The limitation of the volume flow through the oil cooler is provided to prevent damage to the cooler caused by excessive pressure levels.

The disadvantage associated with this is that the volume flow that is diverted to the hydraulic fluid reservoir in order to prevent excessive pressure levels in the cooler is not fed to the cooling system for the starter clutch or to the lubricant supply, so that, especially if the performance of the hydraulic pressure pump is low, these two areas of the secondary circuit will not be supplied with the necessary quantity of hydraulic fluid.

The object of the present invention is to provide a hydraulic system for a transmission with a starter clutch, with excessively high pressure levels in a radiator for a hydraulic fluid, are prevented while, at the same time, the supply of hydraulic fluid to the cooling system for a starter clutch and to the lubricant supply for the transmission are guaranteed even if the hydraulic pressure pump is operating at decreased capacity.

According to the invention, this object is attained with a hydraulic system pursuant to the characterizing features of patent claim 1.

SUMMARY OF THE INVENTION

A hydraulic system for a transmission with a starter clutch, according to the invention, in which a volume flow of the hydraulic fluid through the radiator can be limited by way of a controllable bypass line that feeds into the secondary circuit downstream from the radiator and upstream from the cooling system for the starter clutch and upstream from the lubricant supply, a level of pressure in the radiator for the hydraulic fluid can be advantageously restricted to a maximum level. Furthermore, hydraulic fluid that is in excess of the maximum allowable pressure in the radiator is retained in the secondary circuit in a simple manner and is fed to the cooling system for the starter clutch and to the lubricant supply. In this manner, an insufficient supply of the latter two areas of the hydraulic system is prevented, even if the hydraulic pressure pump is operating at decreased capacity.

Further benefits and advantageous embodiments of the object of the invention are disclosed in the patent claims and in the exemplary embodiment described in principle with reference to the set of drawings.

BRIEF DESCRIPTION OF THE DRAWING

The invention will now be described, by way of example, with reference to the accompanying drawing in which:

The sole FIGURE is a layout of a hydraulic system for a transmission with a starter clutch.

DESCRIPTION OF THE INVENTION

The sole FIGURE shows a layout of a hydraulic system for a transmission with a starter clutch, which is designed with a combined pressure limiting and a pressure reduction valve and with a distributor valve that is attached downstream from a radiator.

In reference to the FIGURE, the layout of a hydraulic system 1 is shown, which can be supplied with hydraulic fluid via a hydraulic pump 2. Connected downstream from the hydraulic pump 2 is a main pressure valve 3, which distributes hydraulic fluid pumped from a hydraulic fluid reservoir 4, in accordance with a preset prioritization plan, to a schematically illustrated primary circuit 24, via which the control of the shifting components is implemented and to a secondary circuit 5 of the hydraulic system 1.

The secondary circuit 5 in this case comprises a combined pressure limiting and pressure reduction valve 6, a radiator 7 for cooling the hydraulic fluid that is pumped from the hydraulic fluid reservoir 4, a distributor valve 8, a cooling system 9 for a starter clutch that is not depicted in detail here, and a lubricant supply 10 for the transmission, which is not shown in detail.

A so-called secondary system pressure is applied to the combined pressure limiting and pressure reduction valve 6 by the hydraulic pump 2 and the main pressure valve 3, wherein a supply of hydraulic fluid to the radiator 7 is prioritized via the combined pressure limiting and pressure reduction valve 6. In this manner it can be ensured that if the hydraulic pump 2 is operating at decreased pump capacity, the volume flow of hydraulic fluid that is fed via the main pressure valve 3 into the secondary circuit 5 will be directed via the combined pressure limiting and pressure reduction valve 6 first in the direction of the radiator 7, and from there to the distributor valve 8.

If a holding pressure of the radiator 7 should occur at the combined pressure limiting and pressure reduction valve 6, hereinafter referred to simply as the valve 6, resulting from its flow resistance and exceeding a predetermined pressure level, a bypass line 11 is opened via the valve 6 and, in order to prevent excessively high pressure levels in the radiator 7, a certain portion of the volume flow of the hydraulic fluid is fed in the direction of a combination point 12.

Once the secondary circuit 5 becomes saturated, the valve 6 switches, based upon the area ratios on a slide 16 of the valve 6, from a pressure-limiting control edge to a pressure-reducing control edge, so that an excessive level of pressure in the radiator 7 and/or a volume flow streaming through the radiator along with the pressure level in the entire secondary circuit 5 are limited to a maximum pressure level, referred to as the saturation pressure.

The two volume flows of hydraulic fluid that are fed through the radiator 7 and the bypass line 11 are brought together at the combination point 12 of the secondary circuit 5, and together are fed to the distributor valve 8. From there, the combined volume flow of hydraulic fluid is fed to the cooling system 9 for the starter clutch or to the lubricant supply 10. Between a supply line 13 that runs between the distributor valve 8 and the lubricant supply 10 for the transmission and another supply line 14, which runs between the distributor valve 8 and the cooling system 9 for the starter clutch, a bypass channel 15 is provided, via which an exchange of hydraulic fluid between a supply line 13 and an additional supply line 14 is possible.

To allow the hydraulic fluid to be brought more rapidly to the operating temperature when temperatures surrounding the transmission are low and shortly after the transmission is started up, a further bypass line 18 branches off from a supply line 17, which runs between the valve 6 and the radiator 7, with this second bypass line feeding into a hydraulic line 19 of the secondary circuit 5 that runs between the radiator 7 and the combination point 12. The additional bypass line 18 is implemented in this case with a thermal valve 20, the hydraulic cross-section of which varies based upon the temperature of the hydraulic fluid. Thus the volume flow of the hydraulic fluid through the radiator 7 can be adjusted to fit the thermal needs of the transmission.

As an alternative, of course, a thermal diaphragm may also be provided in the supply line 17 between the valve 6 and the radiator 7, where this thermal diaphragm is used to simulate a holding pressure of the radiator 7 at the valve 6, which will effect an opening of the bypass line 11 via the valve 6 when the temperatures of the transmission and/or the hydraulic fluid are low. In this manner, the radiator 7 can be circumvented already before its maximum allowable holding pressure is reached; more rapid heating of the hydraulic fluid is also achieved.

The temperature-dependent volume-flow control of the hydraulic fluid through the radiator 7, especially when the temperature of the hydraulic fluid is low, causes the system to reach a desired operating temperature rapidly, at which the hydraulic fluid has a lower viscosity. In this manner, fewer drops in pressure are experienced in the hydraulic system 1 and improved lubrication of the transmission is achieved.

The distribution of the volume flow of hydraulic fluid that is fed to the distributor valve 8 between the cooling system 9 for the starter clutch and the lubricant supply 10 to the transmission is accomplished using two control lines 21 and 22, via which the distributor valve 8 can be controlled. In this, a control pressure signal is present at the control line 21 when a starter process is required, wherein the starter clutch, which is designed as a frictional shifting component, is closed with a slip phase.

When the hydraulic system 1 is in this stage, the distributor valve 8 is controlled via the control line 21 in such a way that the volume flow of hydraulic fluid that is fed to the distributor valve 8 is directed to the cooling system 9 for the starter clutch. Thus it is ensured that the cooling system 9 for the starter clutch is supplied with hydraulic fluid, even if the hydraulic pressure pump 2 is operating at decreased capacity, whereas the supply of hydraulic fluid to the lubricant supply 10 for the transmission, beginning from the additional supply line 14, takes place at a lower priority via the bypass channel 15.

Once the starter process has essentially been completed and the starter clutch is closed, the power loss occurring in the starter clutch and thus also the power loss occurring in the transmission is low enough that the volume flow of hydraulic fluid is directed by the distributor valve 8 toward the lubricant supply 10 for the transmission.

In this operating state of the starter clutch, a control pressure in the starter clutch, which is also applied to the distributor valve 8 via the control line 22, is high enough that the distributor valve 8 is shifted against the control pressure signal of the control line 21. Thus the volume flow of hydraulic fluid that is fed to the distributor valve 8 is directed via the supply line 13 to the lubricant supply 10 for the transmission, and the cooling system 9 for the starter clutch is supplied with hydraulic fluid via the bypass channel 15.

The bypass channel 15 is designed to contain a check valve device 26, which is controlled in parallel to a throttling device 27 in the bypass channel 15. In the event of negative pressure conditions between the lubricant supply 10 and the cooling system 9 for the starter clutch, hydraulic fluid can be fed from the cooling system 9 for the starter clutch through the check valve device 26 to the lubricant supply 10, since here a greater hydraulic cross-section is available for adequately supplying the lubricant supply with hydraulic fluid. Because no hydraulic fluid can be fed in the opposite direction through the combined throttling and check valve device 26, an exchange occurs between the supply line 13 and the supply line 14 via the throttling device 27 in the bypass channel 15, which has a smaller hydraulic cross-section.

With the substantially lower volume requirements of the cooling system 9 for the starter clutch once the starting process has been completed, the flow rate in the radiator 7 can also be advantageously reduced, whereby an adjustment to a lower power loss for the transmission is also possible. The volume flow of hydraulic fluid that is now fed to the lubricant supply 10 is used especially to lubricate a wheel set and other frictional shifting components of the transmission at higher vehicle speeds.

The shifting point for the distributor valve 8, in the present case, is dependent upon a control pressure for a shifting component of the transmission, which ideally is selected to represent a neutral gear of the transmission and the first gear of the transmission, depending on the control pressure of the starter clutch and on a spring 25 that acts upon a slide 23. This embodiment and the control of the distributor valve 8, connected with it, enable an adjustment of the shifting point based upon a load that is present at the starter clutch and the rotational speed difference resulting in a very need-based direction of the hydraulic fluid in the secondary circuit 5.

With the above-described hydraulic system and the associated control of the valve 6 and the distributor valve 8, in comparison with hydraulic systems for transmissions that are known in practical use, a substantially more effective use of the volume flow that is pumped, via a hydraulic pressure pump, is achieved. This advantageously leads to an improvement in the efficiency of the transmission. In addition, due to the achieved optimization in the use of the pump capacity, it is possible for a smaller hydraulic pump to be used than in systems known from practice.

Deviating from the embodiment of the hydraulic system 1 illustrated in the sole FIGURE, in order to prevent excessively high pressure levels in the radiator 7, in a simplified embodiment of the hydraulic system can be provided that a check valve is used to control the bypass line 11 instead of the valve 6. In this, it must be noted that a check valve may suffice, but is not optimal for preventing pressure peaks in the secondary circuit, because check valves are not as capable as the combined pressure limiting and pressure reducing valve of relieving excess pressure levels via the bypass line 11 with sufficient speed.

| Reference numerals | |
|---|---|
| 1 | hydraulic system |
| 2 | hydraulic pump |
| 3 | main pressure valve |
| 4 | hydraulic fluid reservoir |
| 5 | secondary circuit |
| 6 | pressure limiting and pressure reducing valve, valve |
| 7 | radiator |
| 8 | distributor valve |
| 9 | cooling system for the starter clutch |
| 10 | lubricant supply for the transmission |
| 11 | bypass line |
| 12 | combination point |
| 13 | supply line |
| 14 | additional supply line |
| 15 | bypass channel |
| 16 | slide |
| 17 | supply line |
| 18 | additional supply line |
| 19 | hydraulic line |
| 20 | thermal diaphragm |
| 21 | control line |
| 22 | control line |
| 23 | slide of the distributor valve |
| 24 | primary circuit |
| 25 | spring |
| 26 | check valve device |
| 27 | throttling device |

The invention claimed is:

1. A hydraulic system (1) for a transmission with a starter clutch, the system comprising:
   a primary circuit (24) and a secondary circuit (5),
   a cooling system (9) for the starter clutch,
   a radiator (7) for hydraulic fluid, and
   a lubricant supply (10) for the transmission are integrated into the secondary circuit (5), the radiator (7) is arranged upstream from the cooling system (9) for the starter clutch, a volume flow of hydraulic fluid through the radiator (7) is limited by a controllable bypass line (11), which feeds into the secondary circuit (5) downstream from the radiator (7) and upstream from the cooling system (9) for the starter clutch,
   wherein the bypass line (11) is controlled via a combined pressure limiting and pressure reducing valve (6) arranged upstream from the radiator (7).

2. The hydraulic system according to claim 1, wherein the volume flow of hydraulic fluid through the radiator (7) and a volume flow of hydraulic fluid that is fed through the bypass line (11) are combined in front of a distributor valve (8) arranged downstream from the radiator (7).

3. The hydraulic system according to claim 2, wherein a first portion of the combined volume flow of hydraulic fluid is distributed from a first output port of the distributor valve (8) to the cooling system (9) for the starter clutch and a second portion of the combined volume flow of hydraulic fluid is distributed from a second output port of the distributor valve (8) to the lubricant supply (10) for the transmission.

4. The hydraulic system according to claim 3, wherein when the starter clutch is engaged a first portion of the combined volume flow of hydraulic fluid is distributed to the lubricant supply (10) via the first output port of the distributor valve (8), while a second portion of the hydraulic fluid is distributed to the cooling system (9) for the starter clutch via a bypass channel (15) connected with the first output port of the distributor valve (8).

5. The hydraulic system according to claim 3, wherein a control of the distributor valve (8) is implemented based upon a control pressure in the starter clutch, a spring (25) in the distributor valve (8) and a control pressure in a shifting component of the transmission, which is selected to represent a starting gear ratio for the transmission.

6. The hydraulic system according to claim 2, wherein the distributor valve (8) is controlled such that during a start-up of the transmission, the combined volume flow of hydraulic fluid is fed downstream from the distributor valve (8) primarily to the cooling system (9) for the starter clutch.

7. The hydraulic system according to claim 6, wherein hydraulic fluid is pumped to the lubricant supply (10) via a bypass channel (15) that branches off between the cooling system (9) for the starter clutch and the distributor valve (8).

8. The hydraulic system according to claim 7, wherein the bypass channel (15) comprises a throttling device (27) and a check valve device (26), when negative pressure conditions exist between the lubricant supply (10) and the cooling system (9) for the starter clutch, hydraulic fluid is fed from the cooling system (9) for the starter clutch to the lubricant supply (10) via the check valve device (26).

9. The hydraulic system according to claim 1, wherein the volume flow of hydraulic fluid in the secondary circuit (5) is distributed via the combined pressure limiting and pressure reducing valve (6) in a direction of the radiator (7) until a predetermined pressure level in the radiator (7) is reached, and once the pressure level is reached, a portion of the volume flow of the hydraulic fluid is fed from the combined pressure limiting and pressure reducing valve (6), via the bypass line (11), past the radiator (7).

10. A hydraulic system (1) for a transmission with a starter clutch, the system comprising:
    a primary circuit (24) and a secondary circuit (5);
    a cooling system (9) for the starter clutch;
    a radiator (7) for hydraulic fluid; and
    a lubricant supply (10), for the transmission, are integrated into the secondary circuit (5), the radiator (7) being arranged upstream from the cooling system (9) for the starter clutch, a volume flow of hydraulic fluid through the radiator (7) is limited by a controllable bypass line (11), which feeds into the secondary circuit (5) downstream of the radiator (7) and upstream of the cooling system (9) for the starter clutch, wherein the bypass line (11) is controlled via a combined pressure limiting and pressure reducing valve (6) located upstream from the radiator (7); and the combined pressure limiting and pressuring reducing valve (6) is designed such that when the secondary circuit (5) is saturated with hydraulic fluid, the combined pressure limiting and pressuring reducing valve (6) acts as a pressure reducing valve, and otherwise the combined pressure limiting and pressuring reducing valve (6) acts as a pressure limiting valve.

11. A hydraulic system (1) for a transmission with a starter clutch, the system comprising:

a primary circuit (24) and a secondary circuit (5);

a cooling system (9) for the starter clutch;

a radiator (7) for hydraulic fluid; and a lubricant supply (10), for the transmission, are integrated into the secondary circuit (5), the radiator (7) being arranged upstream from the cooling system (9) for the starter clutch, a volume flow of hydraulic fluid through the radiator (7) is limited by a controllable bypass line (11), which feeds into the secondary circuit (5) downstream of the radiator (7) and upstream of the cooling system (9) for the starter clutch, wherein the bypass line (11) is controlled via a combined pressure limiting and pressure reducing valve (6) located upstream from the radiator (7); and a further bypass line (18) is provided in the intake to the radiator (7) for bypassing the radiator (7), a thermal restriction (20) is integrated in the further bypass line (18), and the hydraulic cross-section of the further bypass line (18) is variable dependent upon the temperature of the hydraulic fluid.

* * * * *